(12) United States Patent  (10) Patent No.: US 7,622,163 B2
Crawford et al.  (45) Date of Patent: *Nov. 24, 2009

(54) METHOD FOR IDENTIFYING ARTICLES AND PROCESS FOR MAINTAINING SECURITY

(75) Inventors: Michael Karl Crawford, Glen Mills, PA (US); Kurt Richard Mikeska, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 313 days.

This patent is subject to a terminal disclaimer.

(21) Appl. No.: 11/749,777

(22) Filed: May 17, 2007

(65) Prior Publication Data

US 2008/0024771 A1   Jan. 31, 2008

Related U.S. Application Data

(60) Provisional application No. 60/834,456, filed on Jul. 31, 2006.

(51) Int. Cl.
*B05D 3/06* (2006.01)
*B32B 33/00* (2006.01)
*G01J 1/12* (2006.01)

(52) U.S. Cl. .............. 427/558; 427/98.4; 427/99.4; 427/157; 427/594; 428/41.5; 356/230

(58) Field of Classification Search .......... 356/230, 356/32–35; 427/558, 98.4, 99.4, 157, 594; 313/483; 428/41.5

See application file for complete search history.

(56) References Cited

U.S. PATENT DOCUMENTS 4,442,170 A * 4/1984 Kaule et al. ............. 428/333

6,327,030 B1 * 12/2001 Ifju et al. ................. 356/32
6,576,155 B1   6/2003 Barbera-Guillem
6,861,012 B2   3/2005 Gardner et al.
7,517,564 B2 * 4/2009 Crawford et al. ......... 427/558
2003/0032192 A1   2/2003 Haubold et al.

FOREIGN PATENT DOCUMENTS

WO   WO 03/052025 A1   6/2003

OTHER PUBLICATIONS

Martin et al., Atomic Energy Levels—The Rare Earth Elements, U.S. Department of Commerce, National Bureau of Standards, 1978 (Book not Included).

(Continued)

*Primary Examiner*—Sang Nguyen

(57) ABSTRACT

The invention is directed to a method by exposing at least a portion of a luminescent coating disposed on a surface of an article to ultraviolet light at one or more preselected wavelengths causing said luminescent coating to exhibit a luminescence spectrum, the luminescence spectrum exhibiting a plurality of intensity peaks that have been priorly determined to create a standard; determining the intensity of at least two peaks in the luminescence spectrum of the coating; determining a peak intensity ratio of the at least two peaks; comparing the peak intensity ratio determined with the standard; and, classifying the article according to whether or not the peak intensity ratio does or does not match the standard; wherein the luminescent coating comprises a particulate luminescent composition comprising a rare earth doped fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$.

15 Claims, 1 Drawing Sheet

OTHER PUBLICATIONS

Dhopte et al., Luminescence in CaF2:Eu, Journal of Luminescence, 1992, vol. 54:95-101.

Gustafson et al., Trace Analysis of Lanthanides by Laser Excitation of Precipitates, Analytical Chemistry, 1979, vol. 51:1762-1774.

Doorn et al., Comparison of Calcium Fluoride and Lanthanides by Selective Excitation of Prode Ion Luminescence, Anal. Chem., 1985, vol. 57:2869-2873.

Bender et al., Synthesis and Fluorescence of Neodymium-Doped Barium Fluoride Nanoparticles, Chem. Mater., 2000, vol. 12:1969-1976.

Wang et al., Synthesis and Luminescence Behavior of Eu3 + -Doped CaF2 Nanoparticles, Solid State Communications, 2005, vol. 133:775-779.

Chaudhary et al., Optical Absorption & Thermoluminescence of Gd- and Sm-Doped CaF2 Single Crystals Irradiated With X-Rays, Indian Journal of Pure & Applied Physics, 1983, vol. 21:627-630.

Faulques et al., Synthesis, Fabrication, and Photoluminescence of CaF2 Doped With Rare Earth Ions, Journal of Fluorescence, 1998, vol. 8:283-287.

Cirillo-Penn et al., Laser Spectroscopic Measurement of Point-Defect Dynamics in Eu3+:CaF2, Physical Review B, 1990, vol. 41:799-807.

Hsu et al., Ultraviolet Response PF CaF2:Tm Phosphor With Double Temperature Treatment, Radiation Protection Dosimetry, 1993, vol. 47:235-238.

* cited by examiner

METHOD FOR IDENTIFYING ARTICLES AND PROCESS FOR MAINTAINING SECURITY

FIELD OF THE INVENTION

The present invention is directed to a method for identifying articles, for the purpose of thwarting counterfeiting, by marking the articles with luminescent particles comprising a rare-earth doped alkaline earth fluoride.

BACKGROUND OF THE INVENTION

Luminescent rare-earth doped alkaline-earth fluorides have long been known, and have been employed for numerous purposes such as scintillation detectors and laser materials. $CaF_2$ doped with such rare-earth species as $Eu^{+3}$, $Er^{+3}$, $Tb^{+3}$ are well-known compositions. It is well-known that a rare-earth doped alkaline earth fluoride will exhibit luminescence when exposed to ultraviolet light.

Each rare-earth element when incorporated into an alkaline earth host lattice such as $CaF_2$ exhibits a characteristic excitation spectrum; see, for example, FIG. 1 (101), and a characteristic emission or luminescence spectrum that depends upon the excitation wavelength employed; see, for example, FIG. 1 (102). The excitation spectrum is determined by monitoring the luminescence intensity at one wavelength while the specimen is illuminated over a range of wavelengths. The luminescence spectrum is determined by illuminating the specimen at a single wavelength corresponding to a peak in the excitation spectrum and determining the luminescence spectrum by scanning a detector over a range of wavelengths.

As shown in the figures, each such spectrum consists of a plurality of peaks at different wavelengths of light. The wavelengths at which the peaks occur are characteristic of each rare-earth element. No two rare-earth elements exhibit the same excitation or emission spectra; that is, the peaks in their spectra do not in general arise at the same wavelengths. To obtain luminescence, the rare-earth element must be excited by a light source that emits light at a wavelength corresponding to the location of one of the peaks in the excitation spectrum thereof. In general, the peaks in any one spectrum of rare-earth elements differ from one another in height or intensity, these differences in intensity being characteristic of the rare-earth element under particular conditions of measurement. These and related matters are all well-documented in the art. See for example, Martin et al., *Atomic Energy Levels—the Rare-Earth Elements*, U.S. Department of Commerce, National Bureau of Standards (1978).

Haubold et al., U.S. Published Patent Application 2003/0032192 discloses the use of doped luminescent inorganic compounds for marking goods, such as in use as so-called anti-theft or anti-counterfeiting security markers. Haubold et al., WO 03/052025 discloses printing but no details are provided. Rare-earth doped alkaline earth compositions are not disclosed in Haubold.

Considerable effort in the art is directed towards the provision of compositions useful as so called "security markers" or anti-counterfeiting marks on goods. The idea is to place an identifying mark on a manufactured article which will attest to its authenticity in the face of rampant piracy on a global scale. The mark is ideally invisible until inquiry is made using a particular wavelength of ultra-violet light which stimulates the rare-earth doped fluoride to luminesce with a characteristic spectrum.

SUMMARY OF THE INVENTION

The present invention provides a method comprising exposing at least a portion of a luminescent coating disposed on a surface of an article to ultraviolet light at one or more preselected wavelengths causing said luminescent coating to exhibit a luminescence spectrum wherein the luminescence spectrum exhibits a plurality of intensity peaks that have been priorly determined to create a standard; determining the intensity of at least two peaks in the luminescence spectrum of the coating; determining a peak intensity ratio of the at least two peaks; comparing the peak intensity ratio so determined with the standard; and, classifying the article according to whether or not the peak intensity ratio does or does not match the standard; wherein the luminescent coating comprises a particulate luminescent composition comprising a rare earth doped alkaline earth fluoride represented by the formula

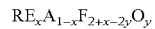

wherein RE represents a three-valent rare-earth element, A is alkaline earth, $0.002 \leq x \leq 0.20$, and $0 \leq y \leq x$.

Further provided in the present invention is a method comprising, within a first time period, a coater causing to be disposed upon the surface of a first plurality of articles, a first luminescent coating, thereby producing a first plurality of coated articles; and, within a second time period, the coater causing to be disposed upon the surface of a second plurality of articles, a second luminescent coating, thereby producing a second plurality of coated articles; a classifier causing to be exposed at least a portion of one or more of the first or second plurality of coated articles to ultraviolet light at one or more preselected wavelengths thereby causing the coating to exhibit, respectively a first or second luminescence spectrum, each the first or second luminescence spectrum exhibiting a plurality of intensity peaks the wavelengths of the peaks having been priorly determined using light comprising the preselected wavelength or wavelengths to create a first standard corresponding to the first plurality of coated articles and a second standard corresponding to the second plurality of coated articles; determining the peak intensity ratio of at least two the intensity peaks in the first or second luminescence spectrum of the first or second coating; comparing the peak intensity ratio so determined with, respectively, the first or second standard depending upon whether the coated article is from the first or second plurality of coated articles; and, classifying the article according to whether or not the peak intensity ratio does or does not match the first or second standard, respectively; each coating comprising a particulate luminescent composition, the particulate luminescent composition comprising a rare-earth-doped alkaline earth fluoride represented by the formula

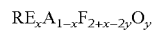

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths.

DETAILED DESCRIPTION

Figure 1:
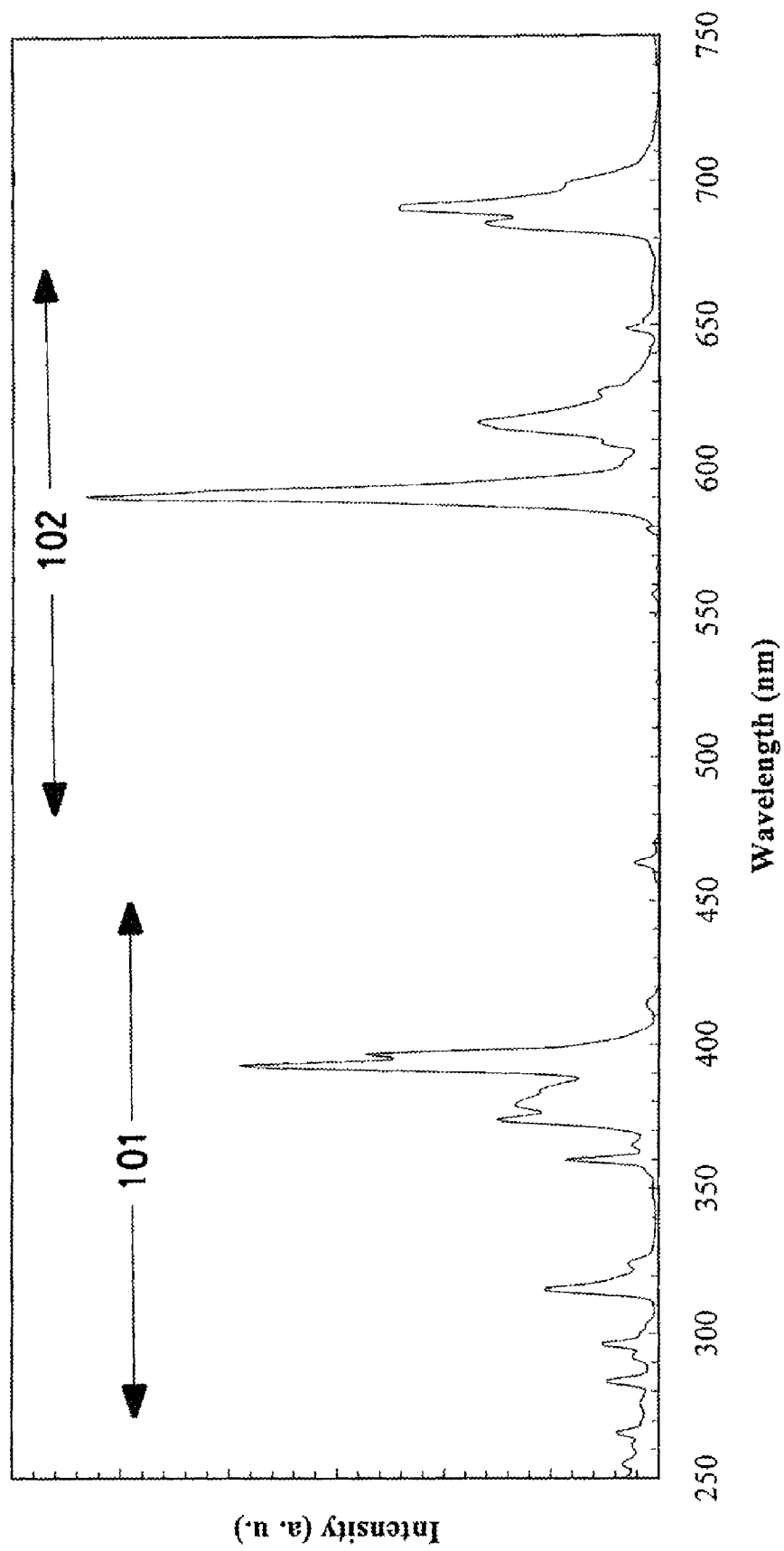
FIG. 1 is an excitation spectrum of $Eu_{0.05}Ca_{0.95}F_{2.05-2y}O_y$, observed at 592 nm and a luminescence spectrum of $Eu_{0.05}Ca_{0.95}F_{2.05-2y}O_y$ excited at 394 nm.

For the purposes of the present invention, the term "classifying" shall be understood to refer to some action undertaken to segregate the coated articles that match the standard from those that do not. Classification can involve sorting into separate boxes, bins, and the like, or could involve simply placing a further marking of some sort on the article to indicate conformity or non-conformity with the standard. In another embodiment classification may simply be a list that can be kept by hand or on a computer memory. The term "classifier" shall be understood to refer to any agent that can determine whether or not the measured peak intensity ration corresponds to the standard, and can cause the act of classification to occur. The classifier may be a human being, but need not be. The classifier can also be a robot or other device that performs the necessary functions.

As the present invention is employed, the manufacturer or distributor of an article acts as the "coater" causing the surface of an article to be marked according to the methods herein disclosed in order to provide positive identification or confirmation of the authenticity of the article so marked. In the sense employed herein, the term "coater" may comprise one or more human beings, corporate entities, and/or robotic devices. The "coater" may refer both to the corporate entity and to a plurality of human beings (for example, shift workers) under the auspices of which corporate entity physically apply the luminescent coating to the surface of the article. "Coater" encompasses the means by which the coating is applied, as well as the means by which the standard is determined. According to the present invention, it is the coater that determines the luminescence standard, and communicates that standard to the "classifier." The luminescence standard may be determined by a third party at the initiative of the coater.

The standard includes information regarding the exposure wavelength, the location of the peaks in the luminescence spectrum, and the peak intensity ratio. This information is communicated from the "coater" to the "classifier" so that the classifier is able to distinguish conforming (authentic) from non-conforming (counterfeit) articles.

In an embodiment, the coated article is transferred, by shipping, to a recipient, typically a customer or a jobber. The recipient makes inquiry of the coated article employing a light source that emits at the preselected wavelengths, and a detector that enables determination of peak intensity ratio of the selected luminescence peaks.

The present invention provides a method comprising exposing at least a portion of the coated surface of an article having a surface having a luminescent coating comprising a particulate luminescent composition to ultraviolet light at one or more preselected wavelengths thereby causing the coating to luminesce, the luminescence spectrum of the coating exhibiting a plurality of intensity peaks that have been priorly determined using light comprising the preselected wavelength or wavelengths to create a standard; determining the peak intensity ratio of at least two peaks in the luminescence spectrum of the coating; comparing the peak intensity ratio so determined with the standard; and, classifying the article according to whether or not the peak intensity ratio does or does not match the standard; the particulate luminescent composition comprising a rare earth doped fluoride represented by the formula

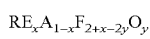

wherein RE represents a three-valent rare-earth element, A is alkaline earth, $0.002 \leq x \leq 0.20$, and $0 \leq y \leq x$.

When each compound represented by the formula

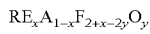

wherein RE represents a three-valent rare-earth element, A is alkaline earth, $0.002 \leq x \leq 0.20$, and, $0 \leq y \leq x$ that has been synthesized at a temperature below about 100° C. is subject to heating in the presence of oxygen in the temperature range from 200-900° C., it gives rise to a family of novel rare-earth-doped alkaline earth fluorides that are characterized by changing luminescence peak intensity ratios. One member of each family of compositions according to the present invention is a composition that has been synthesized at a temperature below 100° C. and has never been subject to a temperature above 100° C. This composition is referred to as the "first reference composition." A second member of each family is a composition that has been synthesized at room temperature and heated to 900° C. for six hours. This composition is referred to as the "second reference composition." Each family of compositions is characterized by one particular rare earth ion, one particular alkaline earth ion, and one particular value of x.

It is found that the first reference compositions are characterized by $y/x<0.050$ whereas the heated compositions are characterized by $0.05 \leq y/x \leq 1$. That is, upon heating to a temperature in the range of 200-900° C., the value of y in the reference composition is observed to increase.

Every member of each such family of compositions exhibits a luminescence spectrum having a plurality of intensity peaks at characteristic wavelengths. For each family of compositions, there exists at least one pair of the peaks at different wavelengths, the relative intensities of which, expressed as the "peak intensity ratio," changes depending upon the temperature/time profile to which the as-synthesized first reference composition has been subject. The heated compositions are characterized by at least one peak intensity ratio that is at least 5% greater than the corresponding peak intensity ratio of the corresponding first reference composition, and that is also at least 5% less than the corresponding peak intensity ratio of the corresponding second reference composition. The term "corresponding reference compositions" refers to the first and second reference compositions that are members of the same family of compositions as the heated composition to which they are being compared. The term "corresponding peak intensity ratio" refers to the peak intensity ratio of the same peaks in the corresponding reference composition as that of the peaks in the heated composition to which peak intensity ratio is being compared.

In order to provide enhanced security, the coater employs in a first period of time a first luminescent coating with which to mark the manufactured articles, and during a second period of time, employs a second luminescent coating, different from the first luminescent coating. In such case, the coater informs the classifier of the change from the first standard to the second standard. Both the luminescent coatings comprise a particulate luminescent compound, the particulate luminescent compound comprising a rare-earth doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$.

In a further embodiment, at least one pair of the intensity peaks at different wavelengths in the luminescence spectrum of the particulate luminescent compound exhibits a peak intensity ratio that is at least 5% greater than the corresponding peak intensity ratio of the corresponding first reference composition, and that is also at least 5% less than the corresponding peak intensity ratio of the corresponding second reference composition.

In one embodiment the particulate luminescent composition is a composition comprising a rare-earth-doped alkaline earth fluoride represented by the formula $$Tb_{0.02}Sr_{0.98}F_{2.02-2y}O_y$$

where y is as defined, supra.

In a further embodiment of the particulate luminescent composition comprises a rare-earth-doped alkaline earth fluoride represented by the formula $$Eu_{0.02}Ca_{0.98}F_{2.02-2y}O_y$$

where y is as defined, supra.

Other embodiments include particulate luminescent compositions comprising rare-earth-doped alkaline earth fluorides represented by the formulae $Eu_{0.05}Sr_{0.95}F_{2.05-2y}O_y$, $Tb_{0.20}Ca_{0.80}F_{2.20-2y}O_y$, and so forth, where y is as defined supra.

In a further embodiment, at least one pair of the intensity peaks at different wavelengths in the luminescence spectrum of the particulate luminescent compound exhibits a peak intensity ratio that is at least 5% greater than the corresponding peak intensity ratio of the corresponding first reference composition, and that is also at least 5% less than the corresponding peak intensity ratio of the corresponding second reference composition.

For the purposes of the present invention, a family of compositions is one in which all members thereof have the same rare-earth element at the same molar concentration, x, the same alkaline earth element at the same concentration, 1−x, fluoride and oxygen, and wherein members are usually differentiated from one another in y as well as by the relative peak intensity ratio of at least one pair of luminescence peaks.

While many of the particulate luminescent compositions suitable for the practice of the present invention can be prepared by heating the as-synthesized reference composition to a temperature in the range of 200-900° C., with the proviso that the duration of heating not exceed one hour at temperatures in the range of 700° C. to 900° C., the compositions themselves, characterized by variations in at least one luminescence peak intensity ratio, are not limited to any particular process by which they are prepared. Regardless of how the particulate luminescent compositions are prepared, there will always be a corresponding composition that meets the limitations of the reference composition as herein defined.

In one embodiment of the particulate luminescent composition, RE is $Eu^{+3}$. In another embodiment, RE is $Tb^{+3}$. In still another embodiment, RE is $Er^{+3}$. In one embodiment of the composition of the invention, A is $Ca^{+2}$. In another embodiment, A is $Sr^{+2}$. In still another embodiment, A is $Ba^{+2}$. In one embodiment of the composition of the invention $0.01 \leq x \leq 0.10$. More specifically, in one embodiment $x=0.02$. In another embodiment of the composition of the present invention, $x=0.05$. In still another embodiment $x=0.10$, and in a still further embodiment, $x=0.20$.

The specific wavelengths of the peaks from which the at least one peak intensity ratio is determined for any particular particulate luminescent composition depend upon the specific rare-earth element employed, and to a lesser degree to the host lattice—whether $CaF_2$, $SrF_2$, or $BaF_2$. However, all the particulate luminescent compositions exhibit the same differentiating characteristic regarding peak intensity ratio changes.

Suitable for use in the particulate luminescent composition is the reference compound associated with each family represented by $$RE_x^{+3}A_{1-x}F_{2+x-2y}O_y$$

where RE is a three-valent rare-earth, A is alkaline earth, $0.002 \leq x \leq 0.20$, and $0 \leq y \leq x$. Each family is characterized by a specific rare earth element, a specific alkaline earth element, and a specific value of x. Additional members of the family can be prepared by heating the reference composition in the presence of oxygen to a temperature in the range of 200° C. to 900° C., followed by cooling, with the proviso that the duration of heating not exceed six hours at 900° C.

One method for the preparation of the first reference compound is the process conducted in fully aqueous solution described in copending U.S. application 60/687646 which is incorporated herein by reference to the entirety. After drying, the synthesis process results in a powder, or fine particulate, form of the rare-earth doped alkaline earth fluoride.

The particulate luminescent composition prepared can be heated to prepare additional members of the compositional family. Any means employed for heating is satisfactory. Suitable means for heating include but are not limited to pressure vessel heating of an aqueous dispersion (so-called hydrothermal heating), electrical resistance furnaces, oil baths, electrically heated crucibles, liquid metal baths, lasers, radio frequency induction furnaces, microwave cavities, gas fired furnaces, oil fired furnaces, and solar furnaces. Preferred is an electrical resistance furnace. Typically, when heated in a bath, the as-synthesized powder is sealed in a heating tube of sufficient volume to leave a head-space comprising oxygen followed by immersion of the heated tube into the heating bath. When the as-synthesized powder is subject to oven or furnace heating it can be heated in an open crucible.

It has been found satisfactory to place the specimen to be heated into a furnace at room temperature, and then heat to the desired end-point at a rate of 2-10° C./minute.

Heating is effected in the presence of oxygen. There are many potential sources for the oxygen. Heating can be effected in air, or in an oxygen atmosphere. It is also possible for oxygen to be devolved from species employed or derived from the synthesis environment such as nitrates or hydroxyls. It is believed that even small amounts of oxygen contamination can be sufficient to effect the process of the present invention.

The luminescent coating may be applied to the surface of the article by any means. Printing an ink has been found to be a convenient means for preparing the coated surface.

In a further embodiment, the coating further comprises a polymer within which the particles of the particulate luminescent composition is dispersed, the polymer adhering to the surface of the article. Conventionally, a polymer serving that function is known as a binder polymer or binder resin.

Useful polymers include, but are not limited to poly(ethylene oxide)s, poly(acrylamide)s, poly(vinylpyrrolidone)s, poly(vinyl alcohol)s and poly(vinyl acetate)s. Included in each of these terms are both homo- and copolymers of the primary monomers. Also included are cellulosic polymers, poly(alpha-olefins) where the olefins contain six or more carbon atoms, acrylic polymers.

Mixtures of polymers are also suitable. Mixtures of polymers often provide a more desirable combination of properties than can be obtained from a single polymer.

One fundamental requirement for the polymer employed herein is that the polymer can not exhibit significant absorbance at either the excitation or emission wavelengths of interest because of interference with the intensity of the observed luminescence.

A coating according to the present invention can further comprise an electrolyte, a humectant, a pH adjusting agent, a defoamer, a plasticizer, a biocide, a dispersing aid or such other adjuvants that are commonly employed in the art of formulating inks and paints.

In general, a suitable coating comprises 100 to 70 parts by weight of the particulate luminescent composition, and 0 to 20 parts by weight of a suitable polymer. Optionally, the composition can contain as much as 20 parts by weight of such other adjuvants as are recited supra.

The articles to which the method of the invention can be applied include any coatable surface, preferably any printable surface. Suitable coatable surfaces include but are not limited to metallic surfaces, such as automobile body parts, coins, paneling, and the like; ceramic surfaces, including glazed surfaces; glass; stone such as marble; molded plastic and fiberglass as in electronics housings and circuit boards, molded sheeting, polymeric films and the like; leather goods; fabrics; including textile goods, canvas, and the like; papers, including coated papers, including currencies, bonds, and other securities, contracts and the like.

Numerous formulations are known in the art for preparing inks, paints, varnishes and other coating compositions. Every such composition in the art that contains inorganic pigments in particulate form can be employed to formulate a suitable ink, paint, or other coating composition where the particulate luminescent composition serves as the pigment. The particulate luminescent composition can serve as the only pigment, or it can be combined with other pigments and particulate matter such as is known in the art of inks and coatings. In one embodiment, a rare-earth-doped alkaline earth fluoride is incorporated into an ink or coating with no other pigment, thereby resulting in a luminescent coating that after application to the surface of an article is largely invisible until subject to UV excitation of luminescence.

Any method of printing may be employed including gravure printing, off-set printing, lithography, screen-printing, ink-jet printing, xerography, and so forth.

According to the present invention, a method is provided wherein the luminescent coating on the surface of the coated article is subject to UV illumination at one or more preselected wavelengths and stimulated thereby to luminesce. The ratio of pre-selected intensity peaks is determined and compared to the standard described supra. Depending upon whether it is determined to match or not match the standard, the coated article is subject to being classified as authentic or inauthentic, respectively.

The specific instrumentation by which the illumination is provided and the relative intensity of the pre-selected luminescence peaks is determined is not critical to the operability of the invention. One method, as described in the specific embodiments is to employ well-known laboratory phosphorimeters and spectrometers, in conjunction with laser light sources, filtered broad band sources, and other sources of illumination well-known in the art of spectroscopy.

Alternatively, an electro-optical reader can be employed for reading an identifying mark as herein described, which comprises a source of light directed towards the mark to illuminate at least a portion of it, a photo-detector means for detecting the luminescence obtained from the illuminated portion of the mark, and a determining means connected with the photo-detector for comparing an output from the photo-detector with a reference signal stored therein to verify the authenticity of the mark. One instrument satisfactory for use in the method of the present invention is the electro-optical reader in Inaba et al., U.S. Pat. No. 6,981,648.

A suitable such electro-optical reader comprises a UV laser oscillator or light emitting diode the light from which is shaped into a fine pencil by a condensing lens. The pencil of laser light emerging from the optical illumination system is directed to the surface of the coating herein described. The luminescence stimulated thereby passes to a photo-detector in the electro optical reader after having passed through a plurality of optical filters operable to permit passage therethrough of only light of the predetermined wavelengths of the luminescence intensity peaks of interest. The photo-detector can be a photodiode, an avalanche photodiode or any other high sensitivity photo-detector. An output signal from the photo-detector array contains the intensity data of the pre-selected intensity peaks. The photodetector signals can be amplified and conditioned as necessary, and the signals are combined to provide the intensity ratios thereof. The resulting ratio is then supplied to a determining circuit which includes a memory in which the standard as described supra is recorded. The determining circuit can be electrically connected with a display unit allowing the result to be visually indicated.

In a further embodiment, the present invention provides a method comprising, within a first time period, a coater causing to be disposed upon the surface of a first plurality of articles, a first luminescent coating, thereby producing a first plurality of coated articles; and, within a second time period, the coater causing to be disposed upon the surface of a second plurality of articles, a second luminescent coating, thereby producing a second plurality of coated articles; a classifier causing to be exposed at least a portion of one or more of the first or second plurality of coated articles to ultraviolet light at one or more preselected wavelengths thereby causing the coating to exhibit, respectively a first or second luminescence spectrum, each the first or second luminescence spectrum exhibiting a plurality of intensity peaks the wavelengths of the peaks having been priorly determined using light comprising the preselected wavelength or wavelengths to create a first standard corresponding to the first plurality of coated articles and a second standard corresponding to the second plurality of coated articles; determining the peak intensity ratio of at least two the intensity peaks in the first or second luminescence spectrum of the first or second coating; comparing the peak intensity ratio so determined with, respectively, the first or second standard depending upon whether the coated article is from the first or second plurality of coated articles; and, classifying the article according to whether or not the peak intensity ratio does or does not match the first or second standard, respectively; each the coating comprising a particulate luminescent composition dispersed therein.

The method of the present invention provides a means for a first party, the "coater," to provide a luminescent identifying mark comprising the particulate luminescent composition described supra on a plurality of objects, and for a second party, "the classifier," to compare the luminescence of the identifying mark on objects received by the classifier to the standard provided to the classifier by the coater. In this manner, the classifier can determine whether the object the luminescent coating of which is being inquired of is authentic or not.

The method further provides for the coater to change the luminescent coating deposited upon the plurality of objects after some period of time from one particular particulate luminescent composition to another, thereby changing the standard as well. By providing the new standard to the classifier, the coater can make whatever change desired in the coating of the plurality of objects.

In particular, it is envisioned that the coater may be a manufacturer or distributor of manufactured articles. In order to combat the presence of counterfeit goods in the marketplace, the coater applies a coating comprising a first embodiment of the particulate luminescent composition as described, supra. The coating so formulated is then applied to the manufactured articles for a period of time. After that period of time, which may be of any arbitrary length, the coater changes to a different coating composition comprising a second, different, particulate luminescent composition. As described supra, the second particulate luminescent composition will exhibit a difference in peak intensity ratios, or different intensity peaks altogether, from those of the first particulate luminescent composition. Therefore the standard as defined supra will also be changed from a first standard to a second standard. By informing the classifier of the change in standard, the coater can then readily change from one identifier to a different identifier.

The coater may provide the carrier information concerning the appropriate standard to employ by any means available in the art, both involving the transfer of written documents, or the transmission of electronic signals to an automated detection apparatus.

EXAMPLES

General Method

Luminescence Spectra

The data were collected with a SPEX JY spectrofluorimeter equipped with the phosphorimeter option. The excitation wavelength was 394 nm (10 nm bandpass) and the pulsewidth was nominally 80 microseconds. Spectra were collected at 5 nm resolution with a 0.1 msec time delay after the excitation pulse to permit background fluorescence from the label substrates to decay. A 405 nm long-pass filter was used before the emission monochromator to eliminate second-order excitation light. Each spectrum was the average of 150 scans, each collected with one excitation pulse per 1 nm wavelength step. The detection time window was 10 msec.

Examples 1-6

23.143 g of $Ca(NO_3)_2.4H_2O$ (Alfa Aesar, 99.98%) and 0.856 g of $Eu(NO_3)_3.5H_2O$ (Sigma-Aldrich, 99.9%) were stirred into 250 ml of deionized water in a polycarbonate Erlenmeyer flask. Separately, 7.482 g of $NH_4F$ (Alfa Aesar, ASC reagent 99%) was dissolved in by stirring into a further 250 ml aliquot of deionized water. Both solutions prepared were stirred for about 5 minutes to ensure dissolution of the solids.

The prepared solutions were simultaneously but separately fed by a peristaltic pump at 10 ml/min through silicone rubber tubing into the two arms of a plastic T. Teflon® tubing ran from the leg or output branch of the T into the product flask. A precipitate formed within the output branch of the T immediately beyond the point at which the two streams merged, forming a suspension in the water. The suspension formed was discharged into the product flask. During the discharge the flask containing the product suspension was stirred by magnetic stirring. After discharge was complete, the suspension was held static for about 24 hrs at ambient temperature. The resulting suspension was then centrifuged (Sorvall RC5C, Thermo Electron Corp.) at a relative centrifugal force of 9500×g for 40 min, and the supernatant (containing soluble salts) decanted and discarded. The residue was redispersed in a fresh aliquot of about 400 ml of deionized water using ultrasonic agitation (Sonics and Materials, Inc, Danbury, Conn.) at 50 W/cm$^2$. The resulting dispersion was centrifuged and the supernatant decanted and discarded. The residue was redispersed as before, and the resulting suspension was dried in a laboratory drying oven at 60° C. in air for 24 hrs to form a dry powder.

Heating

The dried powder was divided by visual estimation into about two equal aliquots. One the aliquot was placed in a covered alumina crucible which in turn was placed into a Fisher Isotemp Programmable Ashing Furnace, Model 497, at room temperature. The specimen was heated in air at a programmed rate of 5° C./min to 900° C., held isothermally for 1 hr, followed by cooling at 5° C./min to room temperature.

The fired powder was hand ground using a mortar and pestle, placed into a ceramic jar mill with ½" milling media. Isopropyl alcohol was added to fill the mill to approx. ⅔ full. The slurry was milled overnight. The milled slurry was placed into a disposable filter and the isopropyl alcohol was filtered off leaving the milled particles in the filter. The particles were air dried for 8 hours placed in a 70 C oven to complete the drying process overnight.

Approximately 1 g of the powder: as prepared was combined with approximately 1 g of a solution of 10% ethyl cellulose and 90% 1-methyl-4-(1-methylvinyl) cyclohexanol (β-terpineol) on the bottom glass plate of a model M-5 Hoover Auto Muller (Hoover Color Corp., Irvingto, N.J.). Two pressure weight plates provided therewith were set in place over the combination and locked into place. Twenty rotations were performed after which the sample was re-spread on the glass plate using a spatula. 4-5 more cycles of twenty rotations were performed, in between each, the sample was re-spread with the spatula. The final product was a highly viscous paste.

The prepared paste was screen-printed on 6 examples of commercially available Ink Jet Labels (Avery Dennison Corp.) label stock using a 325 mesh screen in a Series L-400 screen printer (Engineered Technical Products, Somerville, N.J.). Three coats were applied to each label, to yield a coating weight of approximately 6 mg/cm$^2$ of the Eu-doped CaF2 in the screen-printed films. The films were heated to 110-125° C. for 10 minutes to evaporate any residual solvent.

The luminescence intensity ratios were measured for the 592 nm and 627 nm emission lines for all 6 films was measured using the spectrofluorimeter described above. The results are given in Table 1.

TABLE 1

Intensity ratios of screen printed samples

| Sample | 592/627 |
|---|---|
| 1 | 4.68 |
| 2 | 4.64 |
| 3 | 4.80 |
| 4 | 4.73 |
| 5 | 4.86 |
| 6 | 4.87 |

Examples 7-9

The materials and procedures of Examples 1-6 were repeated. The ink paste so prepared was screen-printed in the manner of Examples 1-6 on 3 examples of the Avery labels upon which a bar-code had first been printed. Unlike in Examples 1-6 only one coat was applied to each label, to yield a coating weight of approximately 2 mg of the Eu-doped CaF2 in the screen-printed films. The films were heated to 110-125° C. for 10 minutes to evaporate any residual solvent.

The luminescence intensity ratio was measured for the 592 nm and 627 nm emission lines for all 3 films, and the results are given in Table 2.

TABLE 2

| Example | 592 nm/627 nm |
|---|---|
| 7 | 4.78 |
| 8 | 4.34 |
| 9 | 4.50 |

Examples 10-14

The preparative method and materials of Examples 1-6 were repeated except that after the second ultrasonically-driven redispersion the resulting suspension was not dried, but rather the resulting suspension was placed into a Teflon® PFA container which in turn was placed into a pressure vessel, and heated to 245° C. for 6 hrs. After the heating the suspension was filtered through a 1.0 um syringe filter. The filtrate was redispersed in deionized water resulting in a suspension that was 5.73 wt. % solids.

The suspension so prepared was ink jetted as 2 cm×2 cm squares onto the surface of a paper or of a Mylar® (DuPont-Teijin Films, Wilmington, Del.) film using a Jetlab II Table-Top Printing Platform (Microfab Technologies, Inc. Plano, Tex.) equipped with a 50 micron nozzle and 1 mm work distance. A single coating layer on a squares consumed 0.5 microliters/cm² which at 5.73% solids comes to a dry weight of 29.8 mircrograms/cm². As indicated in Table 3, coatings of up to 18 coats were prepared. The luminescence intensity ratios determined as described supra for peaks at 591 nm and 614 nm are shown in Table 3.

TABLE 3

Ink-jetted samples

| Example | Number layers | 2% Eu CaF2 (mg/cm2) | Substrate | 591/614 |
|---|---|---|---|---|
| 10 | 12 | 0.3578 | paper | 1.38 |
| 11 | 15 | 0.4470 | paper | 1.82 |
| 12 | 18 | 0.5364 | paper | 1.45 |
| 13 | 15 | 0..4470 | Mylar ® | 2.23 |
| 14 | 12 | 0.3578 | Mylar ® | 2.20 |

What is claimed is:

1. A method comprising exposing at least a portion of a luminescent coating disposed on a surface of an article to ultraviolet light at one or more preselected wavelengths causing said luminescent coating to exhibit a luminescence spectrum wherein the luminescence spectrum exhibits a plurality of intensity peaks that have been priorly determined to create a standard; determining the intensity of at least two peaks in the luminescence spectrum of the coating; determining a peak intensity ratio of the at least two peaks; comparing the peak intensity ratio determined with the standard; and, classifying the article according to whether or not the peak intensity ratio does or does not match the standard; wherein the luminescent coating comprises a particulate luminescent composition comprising a rare earth doped fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$.

2. The method of claim 1 wherein at least one pair of the intensity peaks at different wavelengths in the luminescence spectrum of the particulate luminescent compound exhibits a peak intensity ratio that is at least 5% greater than the corresponding peak intensity ratio of a corresponding first reference composition, and that is also at least 5% less than the corresponding peak intensity ratio of a corresponding second reference composition.

3. The method of claim 2 wherein the intensity ratios differ by at least 10%.

4. The method of claim 1 wherein the coating or the first coating and the second coating further comprise a polymer within which the particles of the luminescent composition are dispersed.

5. The method of claim 4 wherein the polymer is ethyl cellulose.

6. The method of claim 1 wherein RE is selected from $Eu^{+3}$, $Tb^{+3}$ or $Er^{+3}$.

7. The method of claim 1 wherein A is selected from $Sr^{+2}$, $Ca^{+2}$, or $Ba^{+2}$.

8. The method of claim 1 wherein $0.01 \leq x \leq 0.10$.

9. A method comprising, within a first time period, a coater causing to be disposed upon the surface of a first plurality of articles, a first luminescent coating, thereby producing a first plurality of coated articles; and, within a second time period, the coater causing to be disposed upon the surface of a second plurality of articles, a second luminescent coating, thereby producing a second plurality of coated articles; a classifier causing to be exposed at least a portion of one or more of the first or second plurality of coated articles to ultraviolet light at one or more preselected wavelengths thereby causing the coating to exhibit, respectively a first or second luminescence spectrum, each the first or second luminescence spectrum exhibiting a plurality of intensity peaks the wavelengths of the peaks having been priorly determined using light comprising the preselected wavelength or wavelengths to create a first standard corresponding to the first plurality of coated articles and a second standard corresponding to the second plurality of coated articles; determining the peak intensity ratio of at least two of the intensity peaks in the first or second luminescence spectrum of the first or second coating; comparing the peak intensity ratio so determined with, respectively, the first or second standard depending upon whether the coated article is from the first or the second plurality of coated articles; and, classifying the article according to whether or not the peak intensity ratio does or does not match the first or second standard, respectively; each the coating comprising a particulate luminescent composition, comprising a rare-earth-doped alkaline earth fluoride represented by the formula $$RE_xA_{1-x}F_{2+x-2y}O_y$$

wherein RE represents a three-valent rare-earth element, A is alkaline earth, $0.002 \leq x \leq 0.20$, and $0 \leq y \leq x$; the particulate luminescent composition exhibiting a luminescence spectrum having a plurality of intensity peaks at characteristic wavelengths.

10. The method of claim 9 wherein at least one pair of the intensity peaks at different wavelengths in the luminescence spectrum of the particulate luminescent compound exhibits a peak intensity ratio that is at least 5% greater than the corresponding peak intensity ratio of a corresponding first reference composition, and that is also at least 5% less than the corresponding peak intensity ratio of a corresponding second reference composition.

11. The method of claim 10 wherein the intensity ratios differ by at least 10%.

12. The method of claim 9 wherein the coating or the first coating and the second coating further comprise a polymer within which the particles of the luminescent composition are dispersed.

13. The method of claim 9 wherein RE is selected from $Eu^{+3}$, $Tb^{+3}$ or $Er^{+3}$.

14. The method of claim 9 wherein A is selected from $Sr^{+2}$, $Ca^{+2}$, or $Ba^{+2}$.

15. The method of claim 9 wherein $0.01 \leq x \leq 0.10$.

* * * * *